US005095438A

United States Patent [19]

[11] Patent Number: 5,095,438

Sasaki

[45] Date of Patent: Mar. 10, 1992

[54] ENGINE CONTROLLER WITH LOW VOLTAGE RESET

[75] Inventor: Shoji Sasaki, Katsuta, Japan

[73] Assignees: Hitachi, Ltd., Tokyo; Hitachi Automotive Engineering Co., Ltd., Ibaraki, both of Japan

[21] Appl. No.: 383,088

[22] Filed: Jul. 21, 1989

[30] Foreign Application Priority Data

Jul. 27, 1988 [JP] Japan ................................ 63-185366

[51] Int. Cl.[5] ........................ G06F 11/00; G05B 15/00

[52] U.S. Cl. ........................... 364/431.11; 364/431.12; 364/483; 371/12

[58] Field of Search ....................... 364/431.03, 431.10, 364/431.11, 483, 431.12, 431.04, 431.1; 371/12, 66, 13, 14; 307/10.6; 123/491; 340/663

[56] References Cited

U.S. PATENT DOCUMENTS

| | | | |
|---|---|---|---|
| 4,282,574 | 8/1981 | Yoshida et al. | 364/431.10 |
| 4,461,003 | 7/1984 | Tamaki | 371/66 |
| 4,580,222 | 4/1986 | Fujii | 364/431.11 |
| 4,593,667 | 6/1986 | Sasaki et al. | 123/488 |
| 4,737,914 | 4/1988 | Abe et al. | 364/431.04 |
| 4,788,661 | 11/1988 | Morita | 364/431.11 |
| 4,862,364 | 8/1989 | Matsuda | 364/431.10 |
| 4,888,697 | 12/1989 | Hemminger et al. | 364/431.11 |

FOREIGN PATENT DOCUMENTS 2191613 12/1987 United Kingdom .

*Primary Examiner*—Parshotam S. Lall
*Assistant Examiner*—Michael Zanelli
*Attorney, Agent, or Firm*—Antonelli, Terry, Stout & Kraus

[57] ABSTRACT

An engine controller is provided with a microcomputer to effect an engine control through learning on data necessary to control the engine and storing learning results with respect to the data in the microcomputer, and automatically effects reset of the microcomputer when power supply voltage to the microcomputer drops below a predetermined level during an engine operation and initialization of the data after releasing the reset, wherein it is judged whether or not the reset is effected based on drop in the power supply voltage due to a normal operation, and the initialization is inhibited when the reset is effected based on drop in the power supply voltage due to a normal operation.

9 Claims, 3 Drawing Sheets

ENGINE CONTROLLER WITH LOW VOLTAGE RESET

BACKGROUND OF THE INVENTION

The present invention relates to an apparatus for controlling an internal combustion engine, such as a gasoline engine ,using a microcomputer. More particularly, the invention relates to an engine controller employing a learning control system which is adapted for use in automotive gasoline engines.

Among a variety of different kinds of internal combustion engines, gasoline engines for automobiles must be controlled over a very wide operating range with regard to their revolution speed and output under stringent emission gas regulations. It is therefore necessary to correctly maintain a required air-fuel ratio and to obtain an optimum ignition timing at all times under any operating condition.

In recent years, therefore, an engine controller has been widely employed using a microcomputer to totally determine operational conditions of the engine in order to control the air-fuel ratio and the ignition timing.

In such microcomputer-based engine controllers, a so-called learning control system has heretofore been widely used in which a variety of correction data necessary to effect an optimum-control of the engine is successively written into a memory, such as a backup RAM, and the data is used for effecting a control to improve the response speed and to compensate for a change in the characteristics caused by the aging of sensors and actuators. An example of such a learning control system is disclosed, for instance, in U.S. Pat. No. 4,593,667 filed by Hitachi, Ltd. on Mar. 19, 1985.

In such a controller using a microcomputer, on the other hand, the microcomputer may runaway at the time of an instantaneous drop in the power source voltage, such as at the time of starting of the engine. To prevent this, therefore, there has been proposed a system, as disclosed in GB Patent Laid-Open No. 2191613 filed by Hitachi, Ltd. and published on Dec. 16, 1987 in which, when a drop in the power source voltage is detected, the data in the CPU of the microcomputer is first transferred to a RAM to save it and, then, the microcomputer is reset.

In the former controller employing a learning control system, when the power source for the controller is abnormally interrupted, the data stored in the memory becomes no longer reliable at that moment due to the occurrence of erroneous writing by the microcomputer. By taking this fact into consideration in the above-mentioned prior art, therefore, in case the power source is abnormally interrupted, the data for learning control is all initialized, i.e., the data stored in the memory, such as a backup RAM, is all initialized immediately after the power source has recovered.

Here, in such a system, it is desired that the microcomputer is reset like in the latter one of the aforementioned prior arts.

However, in the latter prior art, which responds to a drop in the power source voltage by retaining the data and then resetting the microcomputer, is employed in an engine controller having a learning control function as mentioned above, even a drop in the power source voltage caused under a normal condition of the engine, such as at the time of engine starting, is erroneously recognized as an abnormal operation and the data for learning control is all initialized. Namely, the results of learning revert back to the initial data, and the learning effects are not sufficiently exhibited.

SUMMARY OF THE INVENTION

An object of the present invention is to provide an engine controller which does not permit data stored in a computer memory to be initialized when the power supply voltage to the computer decreases under a predetermined level under conditions that are not abnormal such as at the time cf starting the engine while the data is initialized when the power supply voltage drop takes place under abnormal conditions, whereby the results of learning can be utilized effectively and sufficiently and a reliable control can be effected.

The above-mentioned object is achieved by an engine controller which does not permit the data to be initialized depending upon the control condition of the engine even when a drop in the power source voltage is detected.

The invention will now be described by way of example. When a low power supply voltage for the microcomputer is detected, a non maskable interrupt is applied to the CPU of the microcomputer and then the CPU is reset. In this case, it is examined or judged whether the engine is being started, and the judgment result is transferred from the CPU to a RAM to be saved together with data necessary to control the engine, that is, data which is to be retained. Then, after the CPU that is returned from the reset condition, the content of data stored in the RAM is examined including the judgment result stored therein. When it is confirmed from the stored judgment result that the condition before being reset was a condition in which the engine was being started, then the RAM is not initialized.

Initialization of the data is inhibited even when the power source voltage has dropped provided it took place at the time of starting the engine or during a normal operation of the engine, whereby the learning data is effectively maintained.

DESCRIPTION OF THE EMBODIMENT

Figure 1:
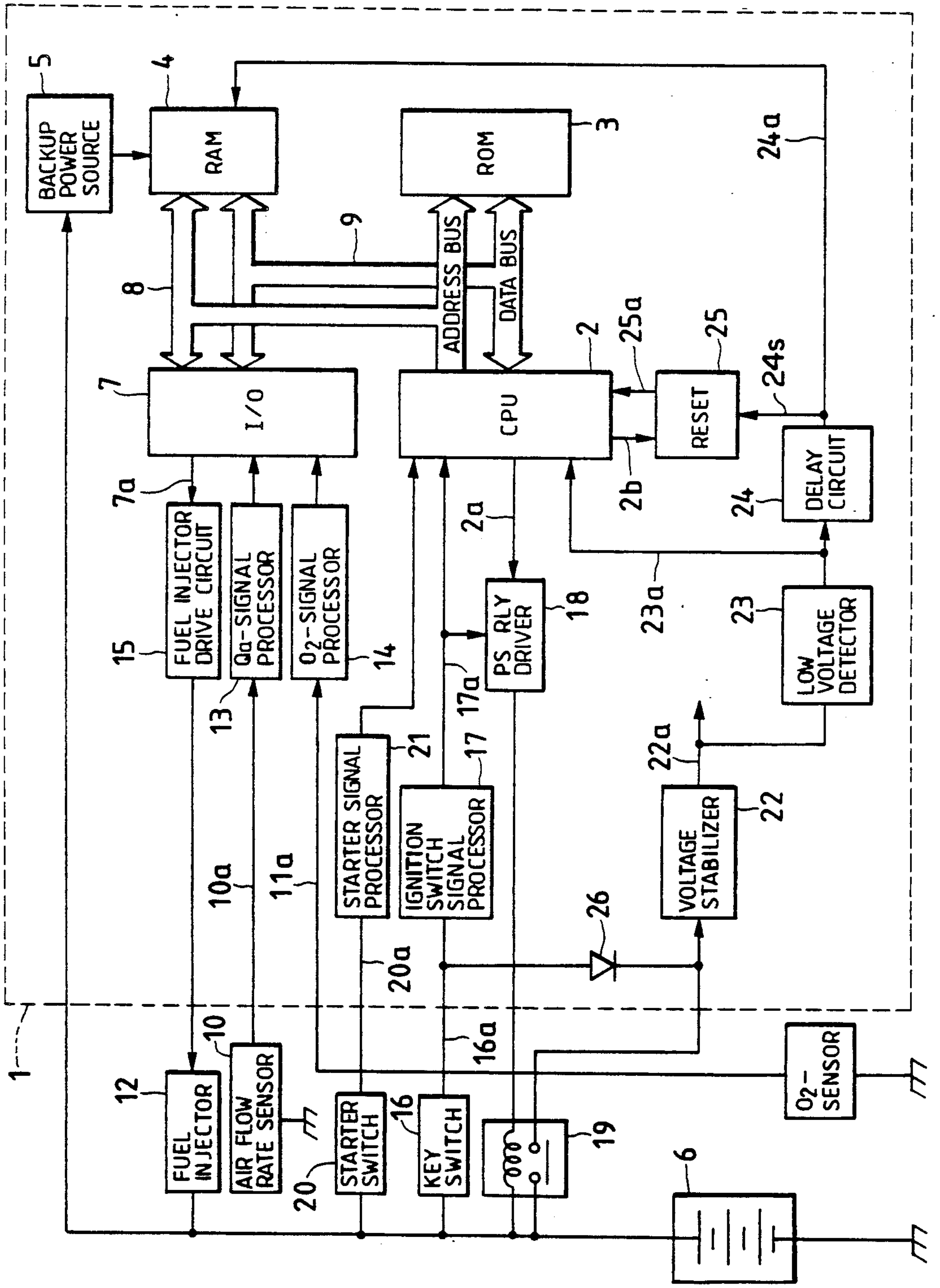
FIG. 1 is a block diagram illustrating an embodiment of an engine controller according to the present invention.

An engine controller according to the present invention will now be described by way of an embodiment shown in the drawings.

FIG. 1 illustrates an embodiment of the engine controller according to the present invention. The engine controller 1 comprises a central processing unit 2 (CPU) of a control microcomputer which carries out a variety of operations, such as determination of an amount of fuel injection and the like, a read-only memory 3 (ROM ) storing a program for executing the above-mentioned operations, a random access memory 4 (RAM) in on which there will be written and stored the results of the operation of the CPU 2, an I/0 7 which receives various input signals and produces control signals, a fuel injection device drive circuit 15 which drives a fuel injection device 12, mounted in an intake passage of the engine, upon receipt of an injection signal *7a*, a power supply relay drive circuit 18 for driving the power supply relay 19 based on signals from a key switch 16 or the CPU 2, a voltage stabilizer 22, a low voltage detecting circuit 23, a delay circuit 24 and a reset circuit 25.

The RAM 4 works as a so-called backup RAM which is supplied with a voltage from a backup power source 5 even when the engine controller 1 is not in operation, that is, not supplied with power. The backup power source 5 is directly coupled to a battery 6, and is supplied with a battery voltage at all times irrespective of whether the engine controller 1 is in operation or not in operation.

The signals inputted to the I/O 7 include a Qa signal 10*a* representative of air flow rate or air flow amount supplied from an intake air flow rate detector 10 which is mounted in an intake passage of the engine to detect the amount of the air taken in by the engine, an $O_2$ signal 11*a* outputted from an $O_2$ sensor 11 which detects the amount of oxygen in the exhaust gas from the engine, and other signals. The control signals that are outputted from the CPU 2 include an injection signal 7*a* for driving the fuel injection device 12, and similar control signals. A Qa signal processing circuit 13 is provided for removing noises included in the Qa signals 10*a*, and an $O_2$ signal processing circuit 14 which removes noise from the $O_2$ signals. The signals that are processed are received by the I/O 7.

The CPU 2 receives some signals and produces some signals, too. For instance, the CPU 2 receives a signal (ST signal) from a starter switch 20 which detects that the starter of the engine is in operation and the engine is being started, and a signal (IGNSW signal) from the ignition key switch 16 indicating that the ignition key is in the ON condition. The ST signal 20*a* and IGNSW signal 16*a* from these switches are inputted to the CPU 2 via an ST signal processing circuit 21 and an IGNSW processing circuit 17.

The CPU 2 produces, for example, a $V_BR$ control signal 2*a* via the power source relay drive circuit 18 to control the power source relay 19 that supplies power source to the engine controller. The engine controller 1 must be in operation while the ignition key switch 16 is ON.

Separately from the $V_BR$ control signal 2*a*, therefore, an IGNSW processed signal 17*a* from the IGNSW processing circuit is inputted to the power source relay drive circuit 18 to turn the power source relay 19 on. When the power source relay 19 is turned on, the battery power is supplied to the engine controller 1 so that it is placed in operation.

When the power is supplied to the engine controller 1, the voltage stabilizer 22 produces a constant voltage e.g., a constant voltage of 5 V, which serves as the power source for the IC's such as the abovementioned CPU 2, ROM 3, I/O 7, and the like.

The low-voltage detector circuit 23 detects a decrease in Vcc voltage 22*a* produced from the voltage stabilizer 22 and sends a non maskable interrupt (NMI) signal 23*a* to the CPU 2, when the Vcc voltage 22*a* drops to be lower than a predetermined voltage, e.g., 4.2 V. The delay circuit 24 produces a RAM standby signal 24*a* after a predetermined period of time, e.g., 100 to 200 μs has passed from the production of the NMI signal 23*a*, and the reset circuit 25 receives a program-run (P-Run) signal 2*b* that is produced from the CPU 2 and that reverses its condition after every predetermined period e.g., after every 10 ms to monitor normal operation of the CPU 2 and, when the P-Run signal 2*b* fails to produce a normal signal, causes the reset signal 25*a* to assume the low level in order to reset the CPU 2.

That is, in order that the data will not be abnormally written into the RAM 4 due to the CPU 2 being in a runaway condition when the battery voltage drops such as at the time of starting when the Vcc voltage 22*a* drops, and to prevent the control operation that continues when the voltage drops instantaneously, the Vcc voltage 22*a* that drops is detected by the low-voltage detector circuit 23, the CPU 2 is interrupted by the NMI signal 23*a*, the required data is transferred into the RAM 4 to be saved and, after a predetermined period of time has passed, the RAM 4 is placed in the standby condition by a RAM standby signal 24*a* produced from the delay circuit 24. At the same time, the RAM standby signal 24*a* is inputted to the reset circuit 25 to forcibly reset the CPU 2. Reset by detecting the low voltage has been disclosed in the GB Patent Laid-Open No. 2191613.

The engine controller 1 further includes a backup diode 26 that operates in case the power source relay 19 becomes defective. That is, the vehicle is no longer able to run if the power source relay 19 becomes defective and no power is supplied to the engine controller 1 in that case. Therefore, the diode 26 is provided and the battery power source is supplied from the ignition key switch 16 to the voltage stabilizer 22 via the diode 26, so that the vehicle is allowed to continue running even in case the power source relay 19 becomes defective. Therefore, so long as the ignition key switch 16 stays on, the power is supplied to the engine controller 1 and the vehicle continues to run.

In order to control the engine to an optimum state by the aforementioned system, the Qa signal 10*a* representative of an air flow rate is corrected depending upon the $O_2$ signal 11*a* produced from the $O_2$ sensor 11 so that the fuel air ratio will be optimum, and the corrected value is stored in the RAM 4 each time the correction is effected thereby to carry out a learning control as disclosed in the specification of U.S. Pat. No. 4,593,667. By adapting the learning control, the control response speed increases when the engine operation condition changes suddenly, and characteristics that are deteriorated due to aging of the intake air flow rate detector 10 are corrected, making it possible to control the engine to an optimum state at all times.

The above-mentioned data for learning control can be rewritten while the engine is being controlled. Depending upon the conditions, however, some data will have to be rewritten after the ignition key switch 16 is turned off. Even after the ignition key switch 16 is turned off, therefore, the power source must be continuously supplied to the engine controller 1 for a predetermined period of time, e.g., 5 to 6 seconds. For this purpose, the CPU 2 produces the $V_BR$ control signal 2*a* so that the power source relay 19 is maintained on for a while even after the ignition key switch 16 is turned off.

When the power source relay 19 becomes defective, on the other hand, the power supplied to the engine controller 1 is interlocked to the ignition key switch 16. That is, the power supplied via the diode 26 is interrupted just as the ignition key switch 16 is turned off. After the ignition key switch 16 is turned off, therefore, it is no longer allowed to rewrite the data even when it is desired to rewrite it. Furthermore, the operation speed of the fuel injection device 12 varies depending upon the battery voltage, and the injection signal 7*a* produced from the I/O 7 corrects the battery voltage. In case the power source relay 19 becomes defective, therefore, the voltage drops in the forward direction of the diode 26, whereby the battery voltage is different from the power source voltage that is supplied to the engine controller 1. The battery voltage is corrected by detecting the voltage supplied to the engine controller 1, and the corrected power source voltage does not necessarily correspond to the practical battery voltage. In this case, when the characteristics of the intake air flow rate detector 20 are corrected based on the output of the $O_2$ sensor 11, a difference in the corrected voltage is corrected, too, and the corrected value to be learned becomes unreliable. When the power source relay 19 become defective, therefore, the data for learning control in the RAM 4 must all be initialized.

In this case, therefore, it is confirmed whether the power source relay 19 is turned off by the $V_BR$ control signal 2a produced from the CPU 2 and whether or not the power source voltage supplied to the engine controller 1 is interrupted or not after the ignition key switch 16 is turned off. That is, predetermined data is written into the RAM 4 before the power source relay 19 is turned off by the $V_BR$ control signal 2a after a predetermined period has passed from when the ignition key switch 16 was turned off. The power source relay 19 is then turned off. When the power source circuit is closed in the next time, the validity of the data in the RAM 4 written just before the power source relay 19 is turned off is confirmed. When it is predetermined data, it is judged that the power source was interrupted by the $V_BR$ control signal 2a the previous time and that it is normal. When the data written in the RAM 4 is not the predetermined data, it is judged that the power source relay 19 was abnormally interrupted the previous time, and the learning control data in the RAM 4 is all initialized.

According to this embodiment, however, the circuitry is so constituted that the CPU 2 is forcibly reset when a low voltage is detected as mentioned above. At the time of engine starting, therefore, when the battery voltage instantaneously drops down to a level that can be detected by the low-voltage detector circuit 23, the CPU 2 is reset and it is incorrectly judged that the power source is abnormally interrupted. Accordingly, the power source relay 19 is determined to be defective and the contents for learning control in the RAM 4 may all be initialized.

To prevent this in this embodiment, therefore, the data in the RAM 4 is not initialized even when an instantaneous drop is detected in the voltage, such as during starting. Details will be described below.

Figure 2:
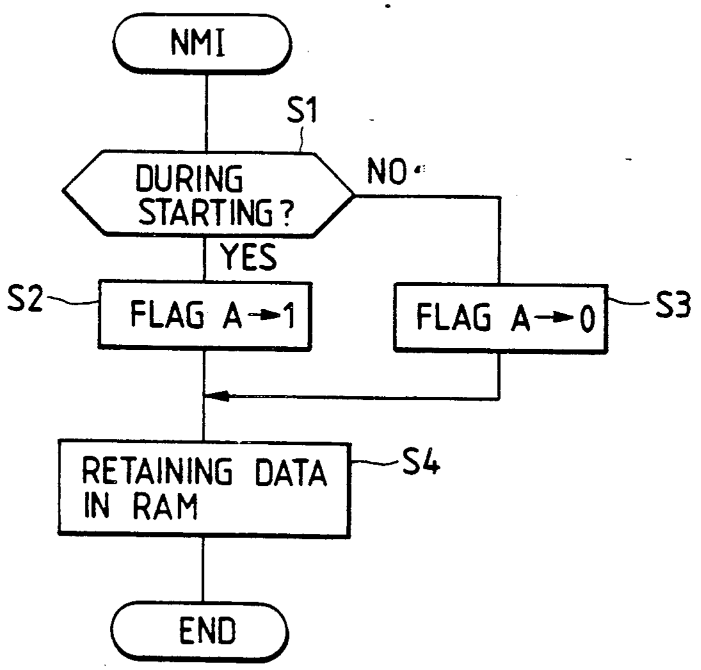
FIGS. 2, 3 and 4 each are a flow chart for explaining the operation of the controller.

FIG. 2 is a flow chart showing the content of processing to be executed by the non maskable interrupt NMI that is produced in the CPU 2 based on a NMI request signal 23a outputted from the circuit 23 when a low voltage is detected by the low-voltage detector circuit 23 according to this embodiment.

When the NMI is generated, first, it is determined whether the engine is involved in starting or not in step S1. Whether the engine is involved in starting can be determined by looking at the condition of the starter switch 20 interlocked to the starter. When the engine is being started in the step S1, a flag A to be stored in the RAM 4 is set to "1" in step S2. When the engine is not being started, the flag A is set to "0" in step S3. Thereafter, the necessary data inclusive of the flag A is transferred to the RAM to save it in step S4. The processing in the CPU is thus finished, and then the RAM 4 is placed under the standby condition by a RAM standby signal 24a produced from the delay circuit 24, thereby to reset the CPU 2.

Figure 3:
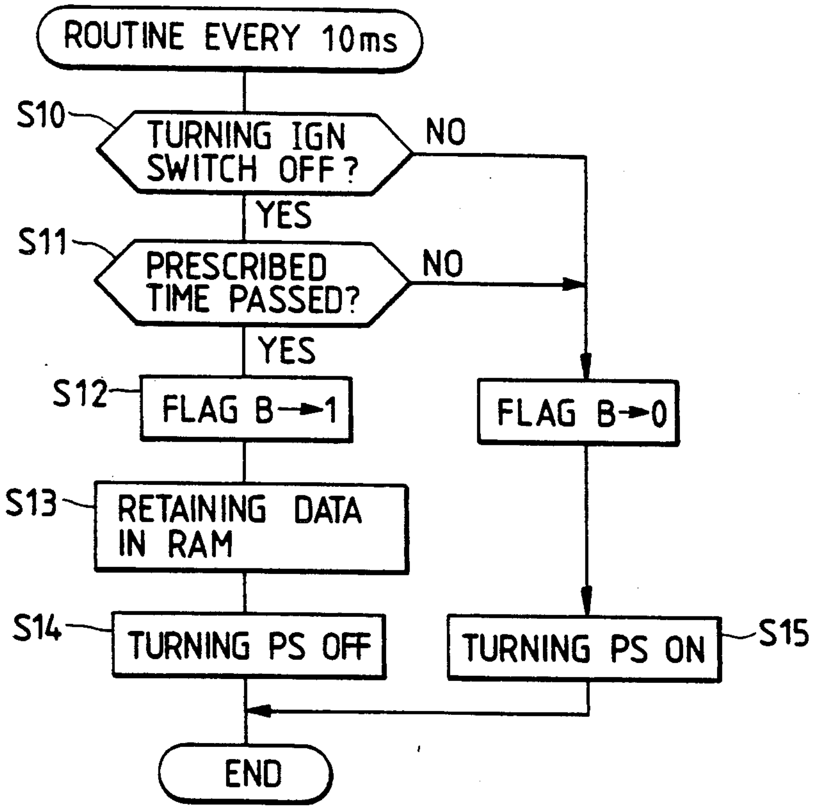

FIG. 3 is a flow chart showing the processing for turning the power source off upon instruction from the CPU after the ignition key is turned off. This routine is executed each time a predetermined period of time such as 10 ms has passed. First, whether the ignition key switch 16 (IGN switch) is off or not is determined in step S10. When it is on, an instruction for turning the power source relay 19 on is produced in step S15. When the ignition key switch 16 is off, whether a predetermined period of time e.g., 6 seconds has passed or not after the ignition key switch 16 was turned off is determined in step S11. When the predetermined period of time has not passed, the step S15 continues to produce the instruction for turning the power source relay 19 on. In case it is determined step S10 that the ignition key switch 16 is on or if it is determined in step S11 that the predetermined period of time has not passed, "0" is written in the flag B. After the predetermined period of time has passed, but before the power source relay 19 5 is turned off in step S14, "1" is written into the flag B in step S12 and various data inclusive of the flag B is transferred to the RAM to save it in a step S13. After the data is all transferred to the RAM, in the step S14 an instruction for turning the power source relay 19 off is produced, and the power source to the engine controller 1 is interrupted to complete the processing.

As described above, the flag A represents a normal condition in which the voltage drops at the time of starting the engine, and the flag B represents the condition where the CPU 2 produces an instruction to turn the power source off. When the two flags are both "0", therefore, it is judged that the power source relay is defective.

Figure 4:
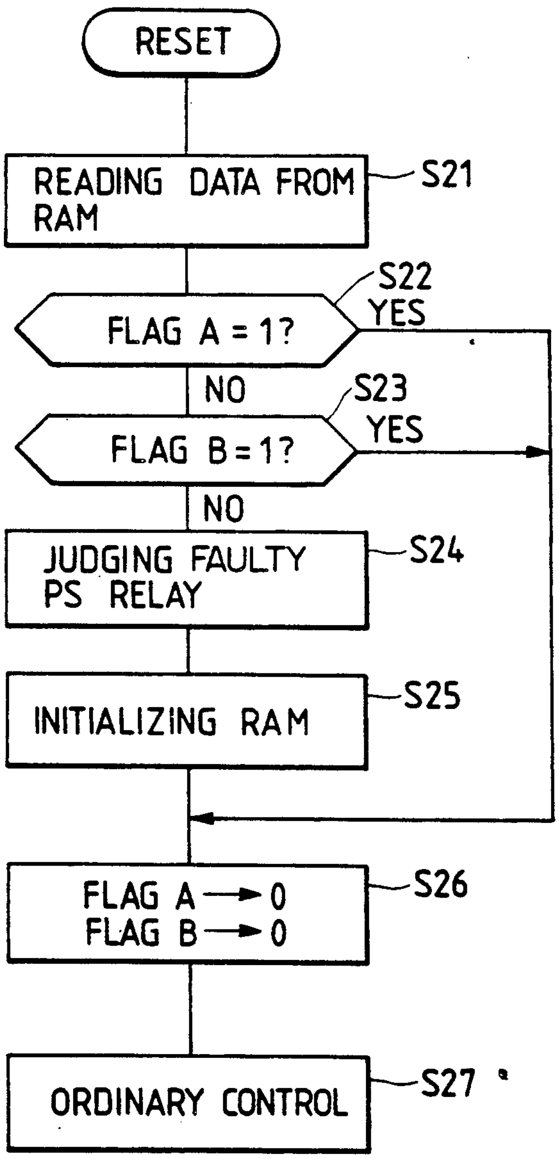

FIG. 4 is a flow chart showing the processing that is executed first following resetting of the CPU immediately after the power source is switched from off to on, or after liberated the CPU is returned from the low-voltage reset condition. First, in a step S21, the data inclusive of flag A and flag B is read from the RAM 4, and in a step S22, whether the flag A is "1" or "0" is determined. That is, it is determined whether or not the reset condition is based on a low-voltage detected during starting of the engine. When the flag A is 1, it is determined that the low-voltage reset is due to starting of the engine, which is determined to be a normal operation. Therefore, the RAM data is not rewritten, and the procedure is transferred to normal control in a step S27. When the flag A is 0 in the step S22, the procedure proceeds to a step S23 to confirm the condition of the flag B. In the step S23, when the flag B is 1, the CPU produces an instruction for turning the power source off. In this case, also, the operation is determined to be normal and the procedure is transferred to normal control in the step S27.

When it is determined in step S23 that the flag B is "0", the procedure proceeds to step S24. In this case, it is determined that the processing is not reset either by the starting of the engine in the step S22 or by turning off of the power source upon instruction by the CPU in the step S23. Therefore, the step S24 that the power source relay is faulty or defective. Then, a step S25 initializes the RAM data. A step 26 detects the power source that is turned off at the time of an abnormal condition, whereby the flags A and B are set to "0" to execute normal control in the step S27.

According to this embodiment, therefore, the data in the RAM 4 is not initialized (rewritten) by the low-voltage resetting at the time of starting the engine, and the data in the RAM 4 for learning control is protected.

It is also possible to protect the RAM data by determining the condition of the ignition key switch 16 instead of determining that the engine is being started in the step S1 of FIG. 2. That is, while the ignition key switch 16 is turned on, the power source is continuously supplied to the controller even in case the power source relay becomes defective. That, is, the voltage drops during this period only when the engine is being started. Therefore, even this embodiment makes it possible to protect the RAM data.

According to the present invention, the learning data is not wastefully rewritten when the power source voltage has dropped at the time of an operation, such as starting the engine, that does not pertain to an abnormal condition. Therefore, the results of learning can be effectively utilized at all times making it possible to properly control the engine.

What is claimed is:

1. An engine controller having a microcomputer for effecting engine control through learning on data necessary to control the engine and for storing learning results with respect to said data in said microcomputer, and having means for automatically resetting said microcomputer when a power supply voltage to said microcomputer drops below a predetermined level during an engine operation and for effecting initialization of said data after releasing said microcomputer from said reset condition, the improvement comprising means for judging whether or not said resetting is effected in response to a drop in the power supply voltage due to a normal engine operation, and means for inhibiting said initialization when said resetting is effected in response to a drop in the power supply voltage due to a normal engine operation, wherein said judging means judges whether or not said resetting of said microcomputer is effected under a condition wherein an ignition key switch is turned off and a predetermined time has passed, and said inhibiting means inhibits said initialization when said resetting is effected under the condition wherein the ignition key switch is turned off and a predetermined time has passed.

2. An engine controller, comprising:

a microcomputer for effecting engine control through learning on data necessary to control the engine and for storing said data;

a power source relay drive circuit for turning on a power source relay in response to a signal from an ignition key switch and for turning off the power source relay in response to a signal from said microcomputer after expiration of a predetermined time following a time said ignition key switch is turned off;

a voltage stabilizer for stabilizing a power source voltage received from said power source really;

a low-voltage detecting circuit for detecting a level of power supply voltage from said voltage stabilizer to said microcomputer and for outputting a NMI request signal to a CPU of said microcomputer when the power supply voltage drops below a predetermined level, in response to which the data stored in said CPU is transferred to a RAM to save said data;

a delay circuit for generating a RAM standby signal for causing a RAM of said microcomputer to stand by after expiration of a predetermined time following a time the NMI signal is received thereby;

a reset circuit for forcibly resetting the CPU in response to the RAM standby signal from said delay circuit;

means for electrically connecting said ignition key switch and said voltage stabilizer, said means including a diode; and wherein said CPU comprises a judging function that judges, when NMI took place according to the NMI signal from said low-voltage detecting circuit and a reset is effected, whether or not the NMI took place during starting of the engine and transfers data including the judging result and said learning data to the RAM to save said data before being forcibly reset, and an inhibiting function that fetches said data saved in said RAM to examine said data after being released from the reset condition and inhibits initialization of said learning data when said reset is based on said engine starting.

3. An engine controller, comprising:

a microcomputer to effect an engine control through learning on data necessary to control the engine and storing the data in said microcomputer;

a power source relay drive circuit for turning a power source relay on in response to a signal from an ignition key switch and for tuning off the power source relay in response to a signal from said microcomputer after expiration of a predetermined time following a time said ignition key switch is turned off;

a voltage stabilizer for stabilizing a power source voltage received from said power source relay;

a low-voltage detecting circuit for detecting a power supply voltage supplied from said voltage stabilizer to said microcomputer and for outputting a NMI request signal to a CPU of said microcomputer when the power supply voltage drops below a predetermined level, in response to which the data stored in said CPU is transferred to a RAM to save said data;

a delay circuit for generating a RAM standby signal for causing a RAM of said microcomputer to stand by after expiration of a predetermined time following a time the NMI signal is received thereby;

a rest circuit for forcibly resetting the CPU in response to the RAM standby signal from said delay circuit;

means for electrically connecting said ignition key switch and said voltage stabilizer, said means including a diode; and means for judging whether or not said microcomputer is reset under a condition that said ignition key switch is turned off and a prescribed time expires following the ignition key switch being turned off, and means for inhibiting initialization of data including learning data for engine control when resetting of the microcomputer is effected under the conditions that said ignition key switch is turned off and the prescribed time has expired.

4. An engine controller, comprising:

a microcomputer for effecting engine control though learning on data necessary to control the engine and for storing learning result data in said microcomputer;

a power source relay through which a supply of power for said microcomputers and interruption of the power supply are effected, said power source relay being connected to a power source and driven by said microcomputer;

means for automatically resetting said micrometer when said power supply to said microcomputer drops below a predetermined voltage level during an engine operation, and for effecting initialization of said data after releasing said microcomputers from said reset condition when the drop in power supply voltage is due to defective operation of said power source relay;

means for judging whether or not said resetting is effected in response to a drop in the power supply voltage due to a normal engine operation or due to defective operation of said power source relay; and means for inhibiting said initialization of said data when said resetting is effected in response to a drop in the power supply voltage due to a normal engine operation.

5. An engine controller, comprising:

a microcomputer for effecting engine control through learning on data necessary to control the engine and for storing learning results with respect to said dada in said microcomputer, to which microcomputer power supply and interruption of the power supply are effected through a power source relay connected to a power source and driven by said microcomputer;

means for automatically resetting said microcomputer when said power supply to said microcomputer drops below a predetermined voltage level during an engine operation and when said power source relay is defective, and for effecting initialization of said data after releasing said microcomputer from said reset condition;

means for judging whether or not said resetting is effected in response to a drop in the power supply voltage due to a normal engine operation; and means for inhibiting said initialization when said resetting is effected in response to a drop in the power supply voltage due to a normal engine operation, wherein said judging means judges whether or not said resetting of said microcomputer is effected under a condition wherein an ignition key switch is turned off and a predetermined time has passed, and said inhibiting means inhibits said initialization when said resetting is effected under the condition wherein the ignition key switch is turned off and a predetermined time has passed.

6. A method of engine control using a microcomputer connected to a power source, comprising the steps of:

(a) effecting engine control using a learning procedure with respect to data required in the control of the engine using said microcomputer;

(b) monitoring the level of voltage supplied to said microcomputer from said power source and detecting when the level of said voltage falls below a predetermined value;

(c) when it is detected that the level of the voltage supplied to said microcomputer falls below a predetermined level:

(i) determining whether the falling of said voltage level is in response to a normal engine operation, (ii) storing in a non-volatile memory data from said microcomputer and status information as to whether the determination in step (c) (i) indicates a normal engine operation, and (iii) resetting said microcomputer; and (d) when it is detected that the level of the voltage supplied to said microcomputer rises above said predetermined level after said microcomputer has been reset:

(i) reading the data which was stored in said non-volatile memory at the time of resetting of said microcomputer, including said status information, (ii) if said status information does not indicate a normal engine operation, initializing said data which was stored in said non-volatile memory at the time of resetting of said microcomputer and releasing the reset condition of said microcomputer, and (iii) if said status information indicates a normal engine operation, releasing the reset condition of said microcomputer for normal operation with the data read from said non-volatile memory.

7. A method according to claim 6, wherein said normal engine operation is the starting of the engine.

8. A method according to claim 6, wherein the voltage of said power supply is supplied to said microcomputer through a power supply relay which is controlled to operate when an ignition switch is turned on and to be thereafter operated by said microcomputer, further comprising the steps of:

(e) detecting when said ignition switch is turned off; and (f) following expiration of a prescribed period of time following detection of the ignition switch being turned off;

(i) storing in said non-volatile memory data from said microcomputer and a first flag indicating that said ignition switch has been turned off; and (ii) turning off said power supply relay from said microcomputer.

9. A method according to claim 8, wherein said status data stored in step (c) (ii) comprises a second flag indicating a normal engine operation, and wherein said step (d) (i) includes determining whether the first and second flags are included in the data which was stored in said non-volatile memory when said microcomputer was reset, and determining that said power supply relay is faulty when neither of the first and second flags is included in the stored data.

* * * * *